UNITED STATES PATENT OFFICE.

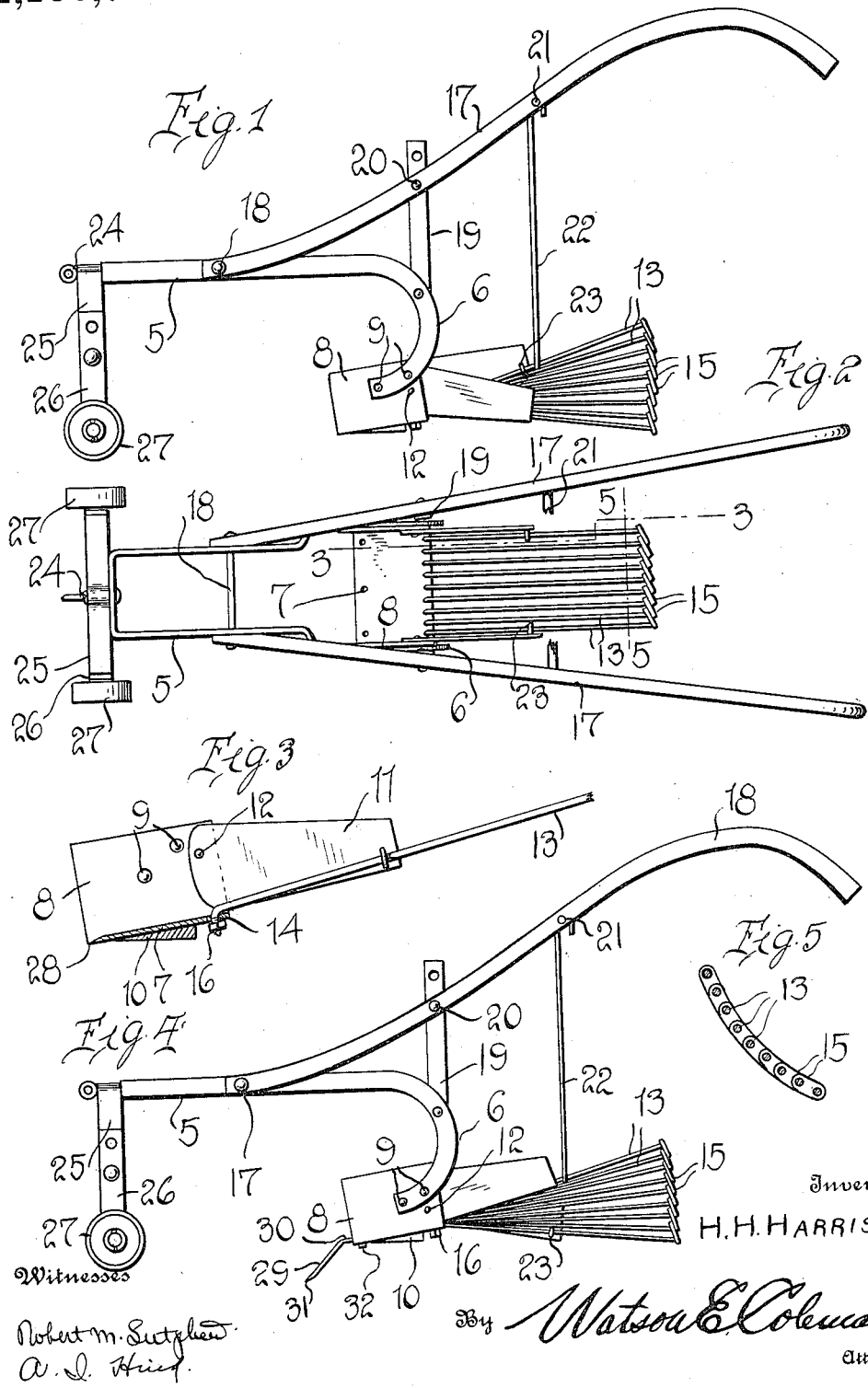

HENRY H. HARRIS, OF TRAVERSE CITY, MICHIGAN.

HARVESTING-MACHINE.

1,153,783.      Specification of Letters Patent.      Patented Sept. 14, 1915.

Application filed January 23, 1915. Serial No. 4,026.

*To all whom it may concern:*

Be it known that I, HENRY H. HARRIS, a citizen of the United States, residing at Traverse City, in the county of Grand Traverse and State of Michigan, have invented certain new and useful Improvements in Harvesting-Machines, of which the following is a specification, reference being had to the accompanying drawings.

This invention relates to harvesting machines, and has for its primary object to provide a machine of this character which is particularly designed for the harvesting of beans, potatoes, onions and like agricultural products, which is simple, as well as strong and durable in its construction, and may be manufactured at comparatively small cost.

The invention has for one of its more important detail objects to provide an improved adjustable moldboard whereby the excavated vegetables may be discharged from the rear of the machine at either side thereof.

It is a further object of my invention to provide means for easily and quickly converting the machine from a combined harvester into a potato digger or vice versa.

With the above and other objects in view, my invention consists in the novel features of construction, combination, and arrangement of parts to be hereinafter more fully described, claimed, and illustrated in the accompanying drawing, in which, Figure 1 is a side elevation of a harvesting machine embodying my invention in its preferred form; Fig. 2 is a plan view thereof; Fig. 3 is a section taken on the line 3—3 of Fig. 2; Fig. 4 is a view similar to Fig. 1, showing the digging blade attached and the opposite side of the moldboard elevated to discharge the vegetables upon the reverse side of the machine with respect to the point of discharge, as shown in Fig. 1; and Fig. 5 is a section taken on the line 5—5 of Fig. 2.

Referring in detail to the drawing, 5 designates the elongated U-shaped body frame of the harvester, the parallel arms of which are outwardly offset at their rear ends and downwardly and forwardly curved, as at 6, to provide suitable standards. Between the lower ends of these standards 6, the angularly bent upwardly extended end portions 8 of a metal blade 7 are secured by means of the bolts or rivets indicated at 9. This blade, which extends between the standards 6, is preferably inclined longitudinally of the machine, and to the under side of said blade, at its rear edge, a suitable shoe or runner 10 is secured. Upon the inner faces of the upwardly projecting end portions 8 of the blade 7, the forward ends of the wings 11 of an adjustable moldboard, are engaged and pivotally connected thereto by the bolts 12. The moldboard proper consists of a plurality of longitudinally extending rods 13, the forward ends of which are angularly bent and loosely disposed through a series of openings 14 provided in the blade 7 adjacent to its rear edge. At the rear ends of the rods 13, the same are flexibly connected by the chain links 15, the extremities of the rods being reduced and disposed through openings in the ends of the links. Suitable retaining nuts 16 are threaded upon the reduced ends of these rods.

To the intermediate portions of the parallel bars of the frame 5, the forward ends of the handle bars 17 are connected by means of the transversely disposed rod 18 which extends through said handle bars and the frame. Uprights 19 are fixed at their lower ends to the curved standards 6, and to the upper ends of these uprights, the respective handle bars 17 are adapted to be adjustably connected by means of the bolts 20, said bolts being designed for insertion through any one of a plurality of openings provided in the uprights. The handle bars 17, rearwardly of the uprights 19, are connected by a cross bar 21. A rod 22 is provided with hooks on its ends, and one of these hooks is adapted for engagement over the cross bar 21 while the hook on the lower end of said rod is engaged with one of the outer longitudinal rods 13 of the moldboard. These outer moldboard rods are held in connection with the pivoted wings 11 by the eyes 23, through which said rods are loosely engaged.

To the intermediate portion of the frame 5, a forwardly extending rod or bolt 24 is fixed, and upon the same, the yoke member 25 is swiveled. The spaced depending arms of this yoke member are provided with the adjustable extensions 26, upon the lower ends of which the supporting wheels or rollers 27 are suitably journaled. It will be understood that, by raising or lowering these supporting wheels, the inclination of the metal plate or blade 7 may be varied, as desired, so that the same will penetrate the soil to a greater or less depth. The forward edge of this blade is beveled or sharpened to a knife edge, as indicated at 28, so that it will readily cut into the soil.

The machine as above described, is used for the harvesting of beans running close to the ground, and as the machine is pushed or drawn across the field, the beans are directed rearwardly over the blade 7 upon the rods 13 of the moldboard. Assuming that one side of this flexible moldboard has been elevated, as shown in Fig. 1, the bean vines will gravitate rearwardly and downwardly over the high side of the moldboard and be discharged from the low side thereof and out of the direct line of movement of the harvesting blade. If it is desired to discharge the beans upon the opposite side of the machine, it is only necessary to shift the rod 22 and engage the hook on the lower end thereof with the opposite outermost moldboard rod 13. The pivoted wings 11 effectually prevent the bean vines from being forced over the high side of the connected series of moldboard rods at the forward end thereof.

When it is desired to use the machine for the digging of potatoes, onions, or similar vegetables, the digging blade or plow 29 is employed. This blade includes an attaching flange 30 and the angularly disposed tapering digging point 31. The blade 7, adjacent its forward edge, is provided with spaced openings to coincide with similar openings in the flange 30. Through these openings, suitable fastening bolts, indicated at 32, are adapted to be disposed, to securely retain the detachable digging point in place. When this digging blade has been applied, the tapering point 31 thereof projects forwardly and downwardly over the edge of the blade 7 and is adapted to penetrate the soil to a considerable depth. Thus, as the machine is drawn, the soil will be furrowed and the earth and vegetables loosened by the digging point directed rearwardly upon the blade 7 and discharged from the moldboard in the manner above explained.

From the foregoing description, taken in connection with the accompanying drawing, the construction, manner of operation, and several advantages of my invention will be clearly and fully understood.

By the use of my improved harvester, a large field of beans or other vegetables may be easily and quickly harvested with comparatively little manual labor.

As but few parts are employed in the construction of my invention and the same are all of simple form, it will be understood that the machine will be very strong and durable in practical use and highly efficient in operation.

It is, of course, obvious that other forms of the detachable digging blade may be provided for use in connection with my improved harvester. I do not, therefore, desire to be limited to the exact form of this blade as it is illustrated in the drawing or to the precise form and arrangement of the several structural features of the machine as such details may be variously modified within the spirit and scope of the invention as claimed.

Having thus fully described my invention, what I desire to claim and secure by Letters Patent is:—

1. In a machine of the character described, a harvesting blade, rearwardly extending wings pivotally mounted on the opposite ends of said blade, a series of flexibly connected directing members loosely mounted at their forward ends upon the blade and extending rearwardly of said wings, said wings at their rear ends being connected to said members, and means adapted for detachable connection to one of said members to dispose the series at a transverse inclination and discharge the harvested vegetables upon either side of the line of movement of the machine.

2. In a harvester of the character described, a harvesting blade, rearwardly extending wings pivotally connected to the ends of said blade, a series of longitudinally disposed rods loosely mounted at their forward ends upon said blade, the outermost rods of the series being mounted upon the rear ends of the respective wings, flexible connections between the rear ends of said rods, and means adapted to be engaged with either of the outermost rods to elevate one of the wings on one side of the series of rods whereby the material is discharged rearwardly from the opposite side thereof.

3. A harvester of the character described including a harvesting blade, rearwardly extending wings pivotally mounted at their forward ends upon the opposite ends of said blade, a series of spaced longitudinally extending rods loosely mounted at their forward ends upon said blade and extending rearwardly of said wings, eyes fixed in the rear ends of said wings and in which the outermost rods are loosely engaged, a link chain connection between the rear ends of said rods, and means adapted to be engaged with either of the outermost rods to elevate the same and the wing connected thereto and dispose the series of rods at a transverse inclination, whereby the material is discharged rearwardly of the machine and at the opposite side thereof.

In testimony whereof I hereunto affix my signature in the presence of two witnesses.

HENRY H. HARRIS.

Witnesses:
  ORAN N. BAILEY,
  JAMES W. HILLIKER.

Copies of this patent may be obtained for five cents each, by addressing the "Commissioner of Patents, Washington, D. C."